United States Patent
Habraken et al.

(10) Patent No.: US 9,667,323 B2
(45) Date of Patent: May 30, 2017

(54) CONTACTLESS COUPLER

(71) Applicant: TE Connectivity Nederland BV, s'Hertogenbosch (NL)

(72) Inventors: Gied Habraken, Valkenswaard (NL); Dirk-Jan Riezebos, Elst (NL)

(73) Assignee: TE Connectivity Nederland BV, S-Hertogenbosch (NL)

( * ) Notice: Subject to any disclaimer, the term of this patent is extended or adjusted under 35 U.S.C. 154(b) by 0 days.

(21) Appl. No.: 14/857,015

(22) Filed: Sep. 17, 2015

(65) Prior Publication Data

US 2016/0006485 A1    Jan. 7, 2016

Related U.S. Application Data

(63) Continuation of application No. PCT/EP2014/054140, filed on Mar. 4, 2014.

(30) Foreign Application Priority Data

Mar. 19, 2013 (EP) ..................... 13160036

(51) Int. Cl.
*H01P 5/00* (2006.01)
*H04B 5/00* (2006.01)
*H01P 1/04* (2006.01)

(52) U.S. Cl.
CPC ......... *H04B 5/0037* (2013.01); *H04B 5/0012* (2013.01); *H04B 5/0031* (2013.01); *H04B 5/0093* (2013.01)

(58) Field of Classification Search
CPC ....................................... H04B 5/00
USPC ................. 333/24 R, 24 C; 340/12.51, 13.26
See application file for complete search history.

(56) References Cited

U.S. PATENT DOCUMENTS

| | | | | |
|---|---|---|---|---|
| 4,818,855 A | * | 4/1989 | Mongeon | G06K 7/0008 235/440 |
| 5,105,201 A | * | 4/1992 | Nakase | H01Q 11/083 333/24 C |
| 5,557,290 A | * | 9/1996 | Watanabe | H01Q 1/1285 343/713 |
| 5,734,355 A | * | 3/1998 | Watanabe | H01Q 1/1285 333/25 |
| 6,661,386 B1 | * | 12/2003 | Petros | H01Q 1/1285 333/24 C |
| 6,686,882 B2 | * | 2/2004 | Petros | H01Q 1/1285 343/700 MS |
| 6,960,968 B2 | * | 11/2005 | Odendaal | H01F 17/0006 320/110 |
| 7,234,154 B2 | | 6/2007 | Lenssen et al. | |
| 8,289,100 B2 | | 10/2012 | Washiro | |
| 8,396,136 B1 | | 3/2013 | Pezeshkian | |

(Continued)

OTHER PUBLICATIONS

International Search Report, Intl Application No. PCT/EP2014/054140, dated May 19, 2014, 4 pages.

*Primary Examiner* — Dean Takaoka
(74) *Attorney, Agent, or Firm* — Barley Snyder

(57) ABSTRACT

A contactless coupler is disclosed. The contactless coupler has an inductive coupling element adapted to transmit and/or receive power by inductive magnetic coupling and a capacitive coupling element adapted to transmit and/or receive a data signal by capacitive coupling. The capacitive coupling element comprises one or more capacitive electrodes disposed at an end of the coupler.

16 Claims, 4 Drawing Sheets

(56) References Cited

U.S. PATENT DOCUMENTS

| | | | |
|---|---|---|---|
| 8,902,016 B2 * | 12/2014 | Pagani | H04B 5/0012 |
| | | | 333/24 C |
| 9,054,745 B2 * | 6/2015 | Moon | H04B 5/0012 |
| 9,089,255 B2 | 7/2015 | Kato | |
| 2012/0309316 A1 | 12/2012 | Edwards et al. | |
| 2013/0183898 A1 | 7/2013 | Strid | |
| 2014/0248801 A1 * | 9/2014 | Riezebos | H04B 5/0031 |
| | | | 439/607.01 |

* cited by examiner

CONTACTLESS COUPLER

CROSS-REFERENCE TO RELATED APPLICATIONS

This application is a continuation of PCT International Application No. PCT/EP2014/054140 filed Mar. 4, 2014, which claims priority under 35 U.S.C. §119 to EP 13160036.3 filed Mar. 19, 2013.

FIELD OF THE INVENTION

The present invention relates to a contactless coupler, and more particularly, to a contactless coupler that combines the transmission of data signals with power transmission.

BACKGROUND

Contactless power couplers are being increasingly used in various applications such as robotics technology, rotary applications and molding equipment, due to their many advantages over conventional power connectors. These advantages include improved operability under hostile environmental conditions for power transmission such as in dirty, humid, or explosive environments. They also allow an unlimited number of mating cycles with a low wear and tear, prevention from electric shocks, sparks and current leaks, and are relatively insensitive to vibrations or misalignment between connecting parts.

Several configurations of contactless couplers for inductively coupled power transfer (ICPT) applications, also called contactless connectors, are known. In general, in ICPT systems the power transfer function is provided by inductive magnetic coupling established between a coil at the power transmitting side and a second coil at the power receiving side. The current circulating through the coil at the transmitting coupler produces a magnetic field that bridges a gap between the front-ends of the transmitting and receiving couplers. The induced magnetic field is picked up by the coil at the receiving coupler, thereby inducing an alternate voltage at the respective coil that is then converted to a DC voltage by an AC/DC converter.

ICPT applications having a wireless inductive coupling for the power link combined with a radio frequency (RF) coupling for the data link have been proposed. For instance, a contactless coupler for ICPT applications that makes use of a 2.4 GHz RF coupling for the transmission of data signals is known. Such contactless coupler includes a 2.4 GHz transceiver which includes a loop antenna that is provided in front of the induction coil and at the coupler front-end. This configuration has the drawback that the medium (air, gas, oil, etc) in between the two coupler halves could attenuate the RF signal, decreasing the reliability and usefulness of the data link.

SUMMARY

The object of the present invention is to provide a contactless coupler that integrates power transfer with data transmission, increasing the reliability of the data transmission while reducing power losses. The disclosed contactless coupler has an inductive coupling element adapted to transmit and/or receive power by inductive magnetic coupling and a capacitive coupling element adapted to transmit and/or receive a data signal by capacitive coupling. The capacitive coupling element comprises one or more capacitive electrodes disposed at an end of the coupler.

BRIEF DESCRIPTION OF THE DRAWINGS

The invention will now be described by way of example with reference to the accompanying figures, of which.

DETAILED DESCRIPTION OF THE EMBODIMENT(S)

Embodiments of a contactless coupler and a contactless coupler system constituted according to the invention will now be described in further detail with reference to the accompanying drawings. This invention may, however, be embodied in many different forms and should not be construed as limited to the embodiments set forth herein; rather, these embodiments are provided so that this disclosure will be thorough and complete and still fully convey the scope of the invention to those skilled in the art.

In the sense of the present invention, the term "contactless" shall mean that no physical contact is necessary between those components of two coupled couplers that enable power and/or data signal transfer between said couplers. Also under circumstances where two couplers actually physically contact each other, the coupler is a contactless coupler because the components within one coupler enabling the power and/or data signal transfer are not in physical contact with the corresponding components of the other coupler in order to enable the signal transfer. The fact that contactless couplers physically contact each other can be due to space restrictions for a particular application area. It is, however, more usual that there is a gap between two coupled contactless couplers as will be further described in detail below. Contactless data transfer shall mean enabling to bridge a distance between two coupled connectors up to the dimension of the mating surface. As an example only, for a coupler having a mating surface with a 12 mm diameter, the possible distance that can be bridged is thus 12 mm.

Figure 1:
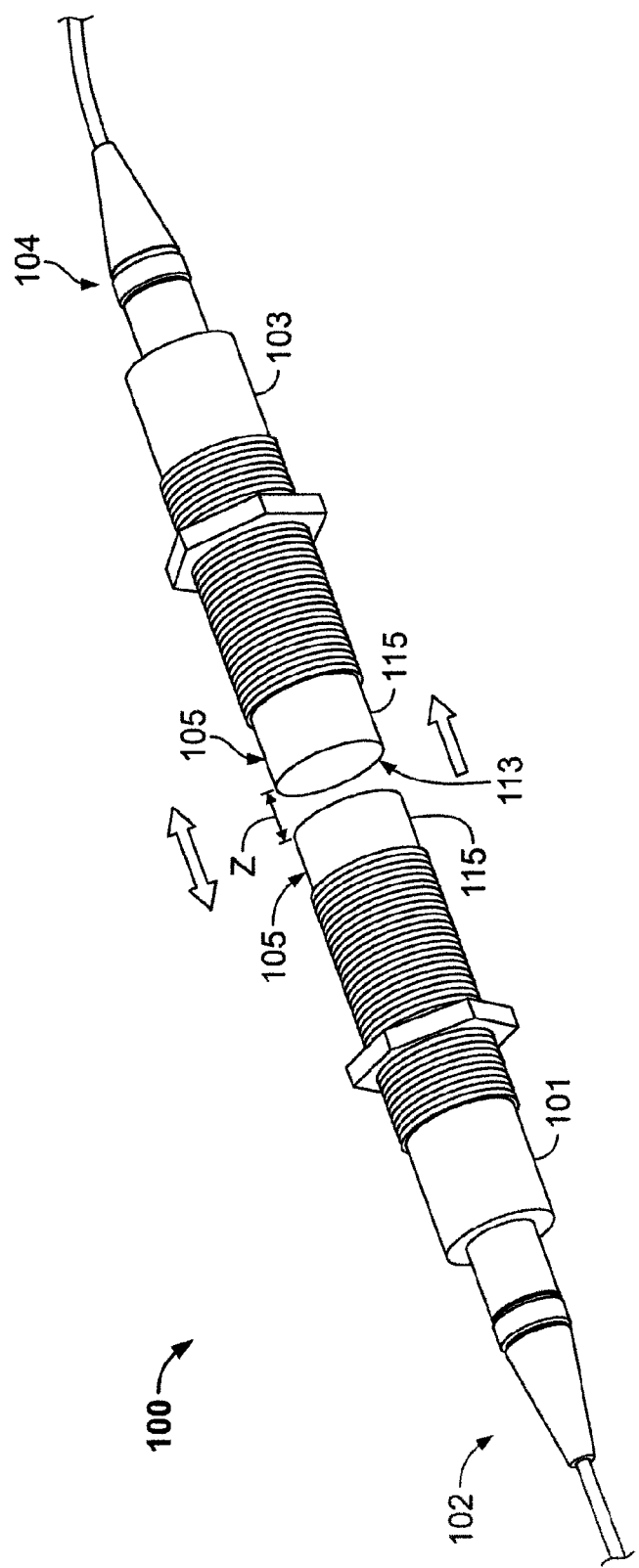
FIG. 1 is a perspective view of a contactless coupler system having a pair of contactless couplers according to an embodiment of the present invention.

FIG. 1 shows a perspective view of a contactless coupler system 100 having a contactless coupler 101 at a transmitting side 102 that can inductively couple power to a mating contactless coupler 103 at a receiving side 104. The transmitting side 102 refers to the side of the contactless coupler system 100 that transmits power by inductive coupling to the receiving side 104, which refers to the side that receives the transmitted power. Each coupler 101 and 103 includes an inductive coupling element (not depicted in FIG. 1), provided close to respective front-ends 105 of the couplers 101 and 103, the front-ends 105 facing the coupling region between the two couplers. The contactless couplers 101 and 103 also include a capacitive coupling mechanism for contactless transmission of signals other than power, such as data signals. The capacitive coupling mechanism is provided by respective capacitive coupling elements (not depicted in FIG. 1) that are arranged at each front-end 105 of the couplers 101 and 103.

Figure 2:
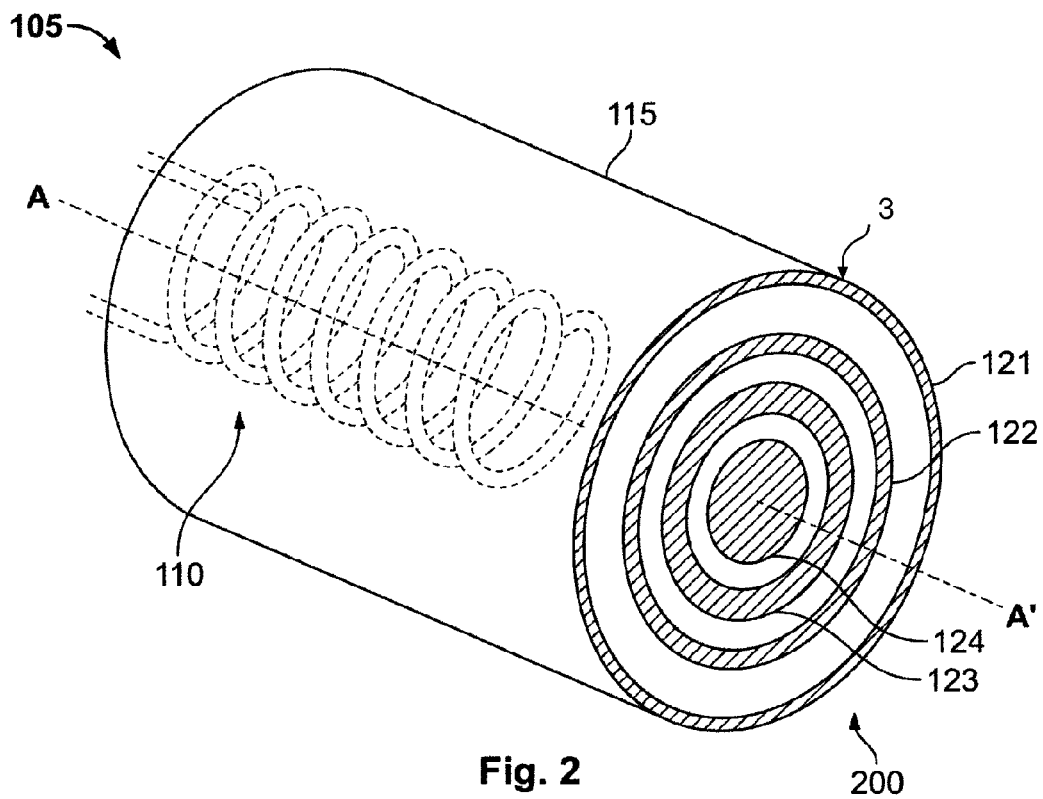
FIG. 2 is a perspective view of a front-end of a contactless coupler according to an embodiment.

FIG. 2 schematically illustrates a coupler front-end 105 having a capacitive coupling element 200 according to an embodiment. The capacitive coupling element 200 is arranged on a front surface 113 of a support element 115 provided at the coupler front-end 105. The support element 115 may be made of or include a layer of electrically insulating material over which the capacitive coupling element 200 is disposed.

As schematically represented in FIG. 2, the inductive coupling element 110 may be arranged inside the support element 115 at the coupler front-end 105. In this case, the support element 115 is made of a non-magnetic and non-conducting material. The inductive coupling element 110 may be a coil having a plurality of windings, which provides the inductive coupling mechanism for the transfer of power over the power link. The coil may be a solid coil wire, multi-stranded coil wire or the like. The wire material can be any material suitable for the described purpose, for example, copper. Referring back to FIG. 1, the inductive coupling element 110 is designed so as to generate a magnetic induction field sufficient for bridging the air gap between the front-ends 105 of the couplers 101 and 103 and inducing a magnetic field at the inductive coupling element 110 of the receiving coupler 103 at the receiving side 104. In the illustrated example, the gap between the couplers 101 and 103 is an air gap. However, the contactless coupler system 100 can also be used in liquid or gaseous environments and/or under vacuum conditions. The inductive coupling so established allows contactless power transfer between the couplers 101 and 103 without any direct physical contact between them.

The capacitive coupling element 200 may be provided with a structure of one or more capacitive electrodes. The capacitive electrodes are electrode plates that are deposited over the front surface 113 of the support element 115 and having a specific shape and/or surface area as will be described later. In the example shown in FIG. 2, the capacitive coupling element 200 comprises four capacitive electrodes 121, 122, 123 and 124 which are concentrically disposed about a longitudinal axis AA' that is substantially perpendicular to the front surface 113 of the support element 115. The application of voltage potentials at the capacitive electrodes of the transmitting capacitive coupling element 200, which reflect a data signal to be transmitted, generates an electric field over the air gap bridging the couplers 101 and 103 and which provides the capacitive coupling necessary for the contactless data link. Suitable electric connections, such as electrical wires, for electrically connecting each capacitive electrode 121-124 and the inductive coupling element 110 to the respective driving circuits are provided inside the support element 115 (not shown). The shape and number of capacitive electrodes of the capacitive coupling element 200 depend on the particular application. For instance, in applications requiring rotational symmetry of the coupler cross-section for allowing the two couplers to be rotated with respect to each other while maintaining an optimal contactless coupling, the shape and structure of the capacitive electrodes must also reflect the desired rotational symmetry.

Figure 3:
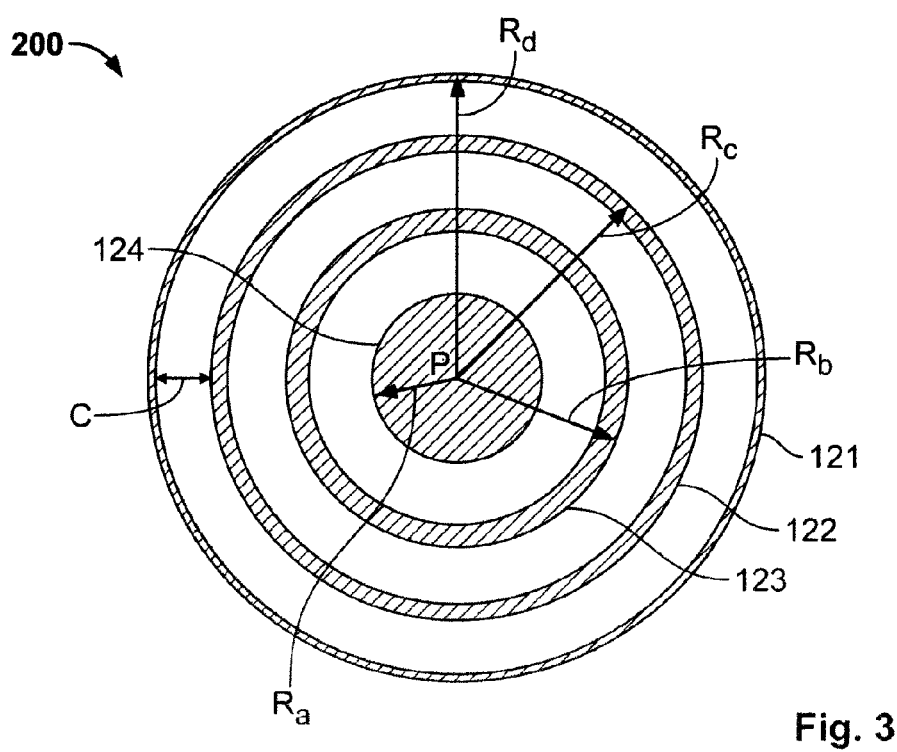
FIG. 3 is a front view of a front-end of the contactless coupler having a capacitive coupling element according to an embodiment.

FIG. 3 shows a front-view of the capacitive coupling element 200 which has a circular symmetry. The capacitive coupling element 200 has a structure of four capacitive electrodes 121, 122, 123, and 124, in which an outer electrode 121 and two intermediate electrodes 122 and 123 having the shape of rings are concentrically arranged about a point P on the longitudinal axis AA'. In the illustrated embodiment, the point P substantially coincides with the geometrical centre of the front surface 113. An inner capacitive electrode 124 with the shape of a circle is also concentrically arranged at the rings center P. By providing a capacitive coupling element 200 with this structure at each coupler 101 and 103, referring back to FIG. 1, a structure of four capacitors is implemented across the air gap between the front-end faces 105 of the couplers 101, 103 when disposed face to face at a separation distance Z.

In the embodiment of FIG. 3, the capacitive electrodes 122, 123, and 124 have a ring shape with circular symmetry. In this case, since any rotation of one of the couplers 101, 103 about its longitudinal axis AA' with respect to the opposed coupler 103, 101 will not cause a significant change in the capacitance value established over the gap, the optimal capacitive coupling can be maintained during data transfer in spite of any relative rotational movement between the coupled couplers 101 and 103. However, other loop shapes could be envisaged such as squared, hexagonal or even elliptical.

The clearance C between the capacitive electrodes 121, 122, 123, and 124, the radius Ra of the inner electrode 124, and the outer perimeter radius Rb, Rc, Rd of the intermediate and outer capacitive electrodes 122, 123 and 121 depend upon the application and physical dimensions of the couplers, as it will be described later. For instance, the dimensions of the capacitive electrodes 121-124 may be selected so that the surface area of each capacitive electrode meets a predetermined capacitance value required for ensuring data transfer at a desired separation gap between the two couplers 101 and 103.

The capacitive electrodes of the capacitive coupling element 200 are generally provided as metallic plates, which are disposed at the coupler front-end 105 as described above. Thus, when significant amounts of power are being transferred by inductive coupling, significant Eddy currents may be induced at the metallic capacitive electrodes 121-124 due to the proximity of the inductive coupling element 110, which is located behind the capacitive coupling element 200.

Figure 4:
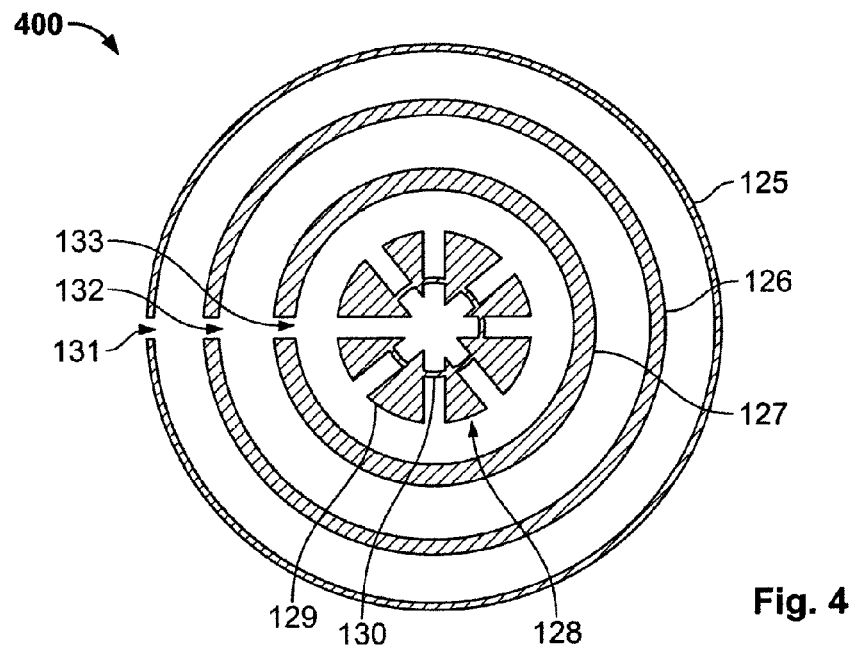
FIG. 4 is a front view of a front-end of a contactless coupler having a capacitive coupling element according to another embodiment.

In order to minimize this effect, an electrode configuration having an open electrode structure may be provided while maintaining the desired capacitance and/or rotational invariance. FIG. 4 shows a front-view of a capacitive coupling element 400 according to another embodiment. The electrode configuration shown in FIG. 4 includes four capacitive electrodes 125-128; an outer capacitive electrode 125 and two intermediate capacitive electrodes 126-127 are provided as capacitive plates with an opened loop-shape. Each loop opening 131-133 is defined across the width of the respective electrode loop 125-128 so as to interrupt any current paths along the loop and therefore, prevent any induced currents from flowing around the electrode. In order to minimize the effect of the openings on the capacitance and/or rotational invariance of the electrode structure, the openings of the loop electrodes should be small when compared to the loop diameter and/or loop length. In particular, the size of the loop openings may be selected so as to maintain the surface area of each loop electrode substantially unchanged. If the section cut out from each loop electrode is small enough, its capacitive value is not influenced while ensuring that there is no induced current flowing in the loop. In this way, the impact of the loop openings on the capacitance value and/or symmetry of the capacitive coupling can be minimized. For instance, an opening width of 10% of the total length of the respective loop, or less, may be provided. As a further example, an opening width of 1% or less may still limit the induced current while maintaining rotational invariance.

Figure 7:
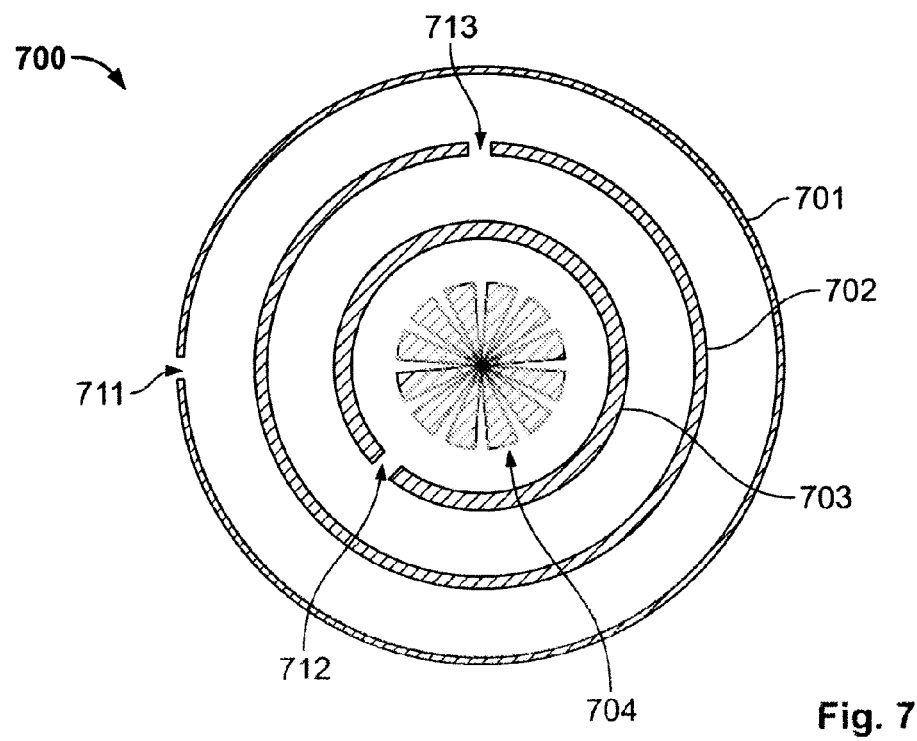
FIG. 7 is a front view of a capacitive coupling element according to a further embodiment.

In the embodiment illustrated in FIG. 4, the openings 131-133 in the loop electrodes 125-128 are aligned with respect to each other along a same direction. However, other electrode configurations in which the openings in the loop electrodes are not aligned, such as shown in FIG. 7, and/or having more than one opening per loop electrode may be envisaged, as long as each loop opening is small enough for not destroying the capacitance value and/or rotational symmetry of the capacitive coupling.

For the outer 125 and intermediate 126-127 loop electrodes, the loop openings 131-133 are relatively easy to realise, for example, by simply cutting small sections in the ring electrodes shown in FIG. 3. The inner capacitive electrode, which is provided as a fully closed circle in the configuration of FIG. 3, must be designed differently so as to maintain the required capacitive area while avoiding the induction of large Eddy currents in the electrode plate. One possible design consists in providing an inner capacitive electrode 128, shown in FIG. 4, having a plurality of electrode parts with substantially a same regular shape, and which are electrically connected to each other by an additional, connecting electrode part. In the example of FIG. 4, the inner capacitive electrode 128 has eight electrode parts 129 with the shape of small triangles and a connecting electrode part 130. The connecting part 130 has the form of an opened ring that electrically connects all the electrode parts 129 together into a single capacitive surface 128 while still avoiding large Eddy currents. The electrode parts 129 are arranged along the perimeter of the connecting electrode 130 at equal spacing so as to maintain the rotational invariance of the overall electrode structure.

Other electrode shapes may be envisaged for the inner capacitive electrode 128, such as a star-like structure, a spiral-like structure, or a structure of stripes connected by a single opened ring or by a plurality of concentric small rings with an opening as the ring electrodes 125, 126 and 127.

Capacitive electrodes with other shapes or geometries than those described above may be used as long as the overall capacitor value does not change significantly during relative rotation between the couplers 101 and 103 and/or induced Eddy currents are prevented from flowing within the respective capacitive electrode. The shape and arrangement of the capacitive electrodes should then provide the desired rotational symmetry for the capacitive coupling. As in the embodiment described with reference to FIG. 3, the capacitive electrodes 125-128 are all arranged concentrically and provide the desired circular symmetry, in spite of the irregular shape of the capacitive electrodes 125-128.

The control of a contactless coupler system according to the principles of the present invention will now be described with reference to FIGS. 5 and 6. As mentioned above, the control of the capacitive coupling element 200 or 400 may be implemented by using capacitive coupling integrated circuits (IC) available on the market. However, the number of capacitive electrodes of the capacitive coupling element necessary for establishing the data link may depend on the number and type of capacitive coupling ICs or the number of necessary data connections.

In case of capacitive coupling ICs that are able to only either supply a current signal to or receive a current signal from a capacitor electrode, a capacitive coupling element with a structure of four capacitive electrodes may be used. In this case, the contactless coupler system is provided with a bi-directional data link with two simplex channels. A contactless coupler system having a unidirectional power link and a bi-directional data link according to the principles of the present invention will now be explained with reference to FIGS. 5 and 6, respectively, in which the transmitting side 102 is represented on the left-hand side and the receiving side 104 is represented on the right-hand side.

Figure 5:
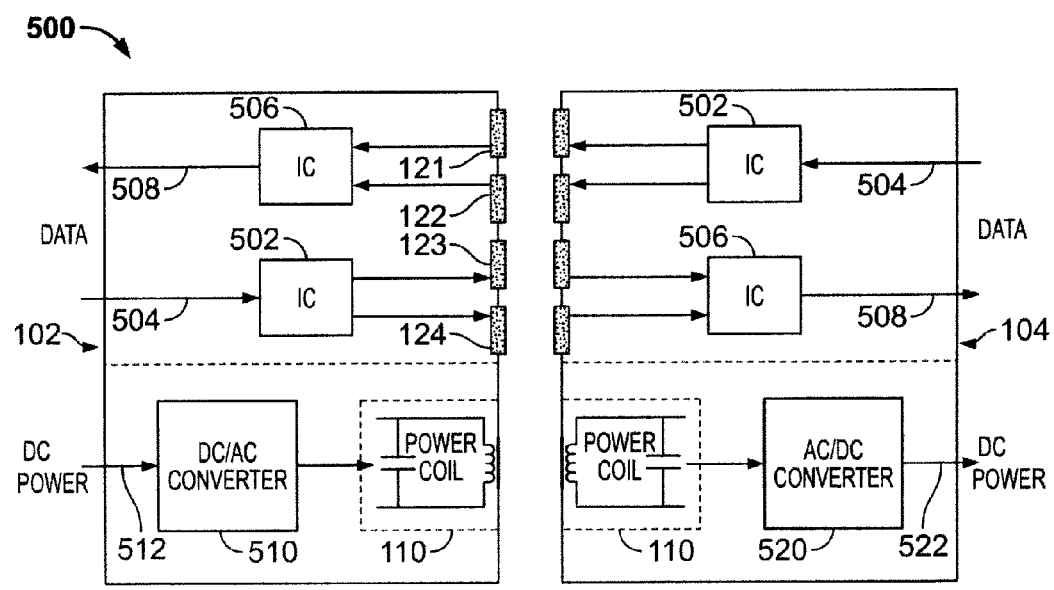
FIG. 5 shows schematically a block diagram of a contactless coupler system according to an embodiment.

FIG. 5 schematically illustrates a contactless coupler system 500 implemented with capacitive coupling ICs that are only able to either supply a voltage signal to or receive a voltage signal from a capacitor electrode. In this case, a capacitive coupling element comprising a structure of four capacitive electrodes, such as the capacitive coupling element 200 shown in FIG. 3, is used at both the transmitting side 102 and receiving side 104, thereby providing a bi-directional data link with two simplex channels. The capacitive electrodes 121, 122, 123, and 124 are schematically represented in FIG. 5 by black rectangular boxes. Referring to the transmitting side 104 shown in FIG. 5, the capacitive electrodes 123 and 124 are driven by a capacitive coupling IC 502 that supplies a voltage signal to the capacitor electrodes 123 and 124 indicative of a data signal 504 input to the capacitive coupling IC 502. A second capacitive coupling IC 506 is then used for driving the other two capacitive electrodes 121 and 122, the second capacitive coupling IC 506 receiving from the capacitive electrodes 121 and 122 voltage signals indicative of a data signal transmitted over the data link by capacitive coupling. Such voltage signals are supplied to the second capacitive coupling IC 506, which converts the received voltage signal into an output data signal 508. In this configuration, two of the capacitive electrodes of the capacitive coupling element 200 are then dedicated to the transmission of data signals input to the capacitive coupling IC 502, which acts as a transmitting capacitive coupling IC. The other two capacitive electrodes of the same capacitive coupling element 200 are then used for receiving data signals by capacitive coupling over the data link and to transmit this signals to the capacitive coupling IC 506, which acts as a receiving capacitive coupling IC. A similar configuration is provided at the receiving side 104.

As shown in FIG. 5, the inductively coupled power transfer is implemented by providing a DC/AC converter 510 that converts a DC power 512 to be transmitted into an AC current to be applied to the inductive coupling element 110 at the transmitting side 102. Due to the inductive coupling over the power link, a corresponding AC current is induced at the inductive coupling element 110 at the receiving side 104. This induced AC current is then converted by an AC/DC converter 520 into a transmitted, output DC power 522. Although in FIG. 5 the elements providing the power transfer function by inductive coupling are represented side-by-side with the elements providing the data transfer function by capacitive coupling, this is for the purpose of explanation only. Namely, as mentioned above, the inductive coupling element 110 is located behind the capacitive coupling element 220 with respect to the coupler front-end 105.

The control operation described above also applies to the case where a capacitive coupling element 400 according to the embodiment of FIG. 4 is used instead at both the transmitting side 102 and the receiving side 104.

Figure 6:
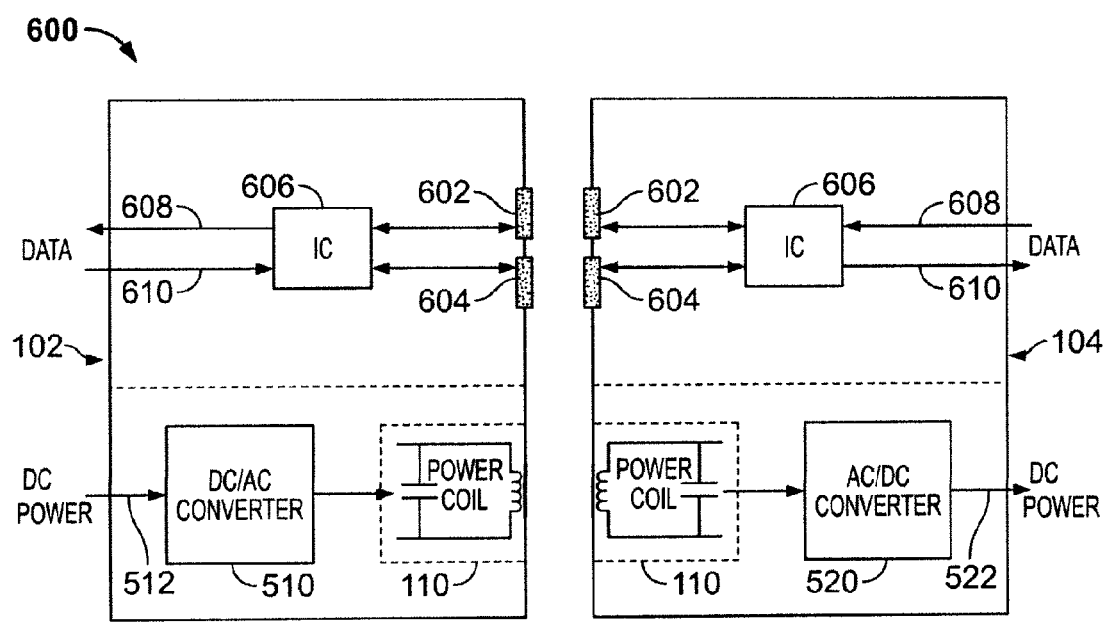
FIG. 6 shows schematically a block diagram of a contactless coupler system according to another embodiment.

FIG. 6 schematically illustrates a contactless coupler system 600 according to another embodiment, in which the bi-directional data link is provided with one half-duplex channel. In contrast to the example illustrated in FIG. 5, this configuration is implemented with capacitive coupling ICs that are capable of both transmitting and receiving a current from a capacitive electrode at the same time or at least to perform both operations. In this case, since it is possible to switch the operation state of the capacitive coupling ICs between sending and receiving modes, a capacitive coupling element with only two capacitive electrodes 602 and 604 is required. For instance, this embodiment may be implemented with any two capacitive electrodes of the capacitive coupling elements 200 or 400 described above. Referring to the transmitting side 102 shown in FIG. 6, a single capacitive coupling IC 606 is provided for driving the capacitive electrodes 602 and 604. The external data signal 608 that is input to the capacitive coupling IC 606 can then be supplied to both capacitive electrodes 602 and 604 for transmission over the data link. On the other hand, both the capacitive electrodes 602 and 604 at the power transmitting side 102 may also be used for receiving data signals transmitted by capacitive coupling over the data link and which are then transmitted to the same capacitive coupling IC 606 for conversion into an output data signal 610. A similar configuration as described above is provided at the receiving side 104. The inductively coupled power transfer is implemented in the same way as described with reference to FIG. 5.

As mentioned above, the control of the capacitive coupling elements 200 or 400 may be implemented by using capacitive coupling integrated circuits available in the market. Commercially available capacitive coupling ICs are quite often designed for driving capacitors with specific capacitance values, which imposes certain constraints on the dimension of the interacting capacitive electrodes and respective coupling distance.

In particular, a minimum capacitance value is often required in order to ensure transfer of the data signals via the capacitive coupling. For instance, certain capacitive coupling ICs require a capacitive plate with essentially 1 centimeter square for bridging a distance of one centimeter over the gap.

On the other hand, many applications in the field normally require a certain distance between the two couplers 101 and 103 in order to implement the capacitive link. For instance, certain applications impose a minimum separation distance Z, which we will also refer to as a coupling distance, of at least 1 mm between the coupler front-ends 105 so as to avoid physical contact between the opposing electrodes, etc. This also imposes design constraints on the physical dimensions of the couplers that can be used. As an example, the cross-sectional diameter of a typical M12 connector might not be suited for certain applications since it does not provide a sufficient cross-section for arranging the capacitor electrodes.

Thus, the geometry and surface area of the capacitive electrodes is determined based on the coupler operation conditions, such as minimum capacitance value and/or minimum coupling distance to be met, so as to provide the predetermined capacitance value at the desired coupling distance during use.

For example, in the case that each of the two couplers 101, 103 is provided with the electrode configuration 200, when the two couplers 101, 103 are oriented with facing front-ends 105 along a same longitudinal axes AA' as shown in FIG. 1, each capacitive electrode 121-124 at the coupler 101 establishes a capacitive coupling with the corresponding capacitive electrode at the adjacent coupler 103. This capacitive coupling is characterized by a capacitance value that depends on the surface area A of the capacitive electrode, the separation distance Z between the corresponding capacitive electrodes on each coupler halves, and the permittivity ε of the medium in the gap. Using the parallel-plate capacitor approximation, the capacitance value is then substantially equal to $$\varepsilon \frac{A}{Z}.$$

In order to meet the minimum capacitance requirement at the desired coupling distance, the minimum surface area $A_{min}$ needed for each capacitive electrode can be determined by taking into account the above considerations. In particular, the dimensions of the capacitive electrodes 121-124 can be selected so that they all have the same surface area. Referring to the example shown in FIG. 3, the values of radius Ra to Rd can be selected so that each capacitive electrode has the same minimum surface area $A_{min}$ using the following relations:

$$\pi Ra^2 = A_{min} \tag{1}$$

$$\pi Rb^2 - \pi(Ra+C)^2 = \pi Rc^2 - \pi(Rb+C)^2 = \pi Rd^2 - \pi(Rc+C)^2 = A_{min} \tag{2}$$

The radius Ra for the inner capacitive electrode 124 should then be equal to $\sqrt{(A_{min}/\pi)}$. The values of the outer radius Rb, Rc and Rd can then be iteratively determined based on Ra and the clearance C as follows:

$$Rb = (2Ra^2 + 2Ra\ C + C^2)^{1/2} \tag{3}$$

$$Rc = (Ra^2 + Rb^2 + 2Rb\ C + C^2)^{1/2} \tag{4}$$

$$Rd = (Ra^2 + Rc^2 + 2Rc\ C + C^2)^{1/2} \tag{5}$$

As an example, in case a 16 mm² surface area is required per capacitive electrode for a minimum coupling distance of 4 mm, the radius Ra of the inner capacitive electrode 124 should be at least $Ra = \sqrt{(A/\pi)} = 2.256$ mm.

The requirement that all electrodes have substantially a same surface area leads to the width of the loop-shape electrodes 121-123 not being the same but decreasing with the increase of the respective loop length and/or loop radius. As illustrated in FIG. 3, the increase in the outer radius Rd-Rb of the loop electrodes 121-123, from the innermost loop electrode 123 towards the outermost loop electrode 121, is compensated by a respective decrease in the electrodes width so as to maintain the overall surface area of each electrode substantially the same.

The clearance C corresponds to the separation distance between any two neighbor capacitive electrodes 121-124 of the same coupling element 200 and its value depends upon the specific application, such as the cross-section of the coupler body. In typical applications, a clearance of 1 mm may be used. The coupler cross-section also imposes an upper limit on the outer radius Rd of the outer capacitive electrode 121. In the case of using M18 or M30 type connectors, the maximum radius for the outer electrode Rd in the embodiments of FIGS. 3 and 4 would then be limited to 18 mm or 30 mm, respectively.

The above relations may be also applied to the embodiment described with reference to FIG. 4, since as explained above, the area of the loop openings 131-133 is small enough so that it does not affect the electrode area. In particular, the width of the openings 131-133, which corresponds to the distance between two ends of the same open-loop electrode, should be substantially equal to or less than a predetermined fraction of the total length of the respective electrode. By keeping the opening width within a given range, the effect of the openings in the overall capacitance value as well as in the symmetry of the capacitive coupling can be reduced or even eliminated while preventing induced Eddy currents from flowing along the capacitive electrodes. In alternative electrode configurations, where loop electrodes with openings larger than the ranges mentioned above are provided, the radial width of the loop electrode may be increased so as to compensate for the effect of the opening size in the overall surface area of the loop electrode. In this way, it is ensured that the requirement of a minimum capacitance value is still fulfilled.

Regarding the inner capacitive electrode 128, the surface areas of all electrode parts 129 and connecting loop 130 should also provide the required minimum capacitance value. In the example described above, these surface areas should sum to $A_{min}$.

Thus, the capacitive coupling element 400 is designed so that the overall capacitor value does not change significantly during relative rotation between two coupled couplers 101, 103. This condition is met as long as the loop openings 131-133 are small enough in comparison with the electrode surface so as not to influence the capacitance value. Further, in order to prevent induced Eddy current from flowing within the capacitive electrodes, the capacitive electrode 125-128 should not form closed loops and/or be so large that it allows the formation of closed current paths within the electrode.

A further example of an electrode configuration meeting the above requirements is illustrated in FIG. 7, which shows a front view of a capacitive coupling element 700 according to an embodiment. The capacitive coupling element 700 includes an outer capacitive electrode 701 and two intermediate capacitive electrodes 702-703 with an opened loop-shape similar to the loop-shape electrodes shown in FIG. 4 but in which respective loop openings 711-713 are not provided along a same radial direction. In addition, the capacitive coupling element 700 includes an innermost capacitive electrode 704 arranged at the centre of the outer and intermediate capacitive electrodes 701-703, and which is formed by 12 triangular-shaped electrode parts that are electrically connected to each other by their vertices. The dimensions and distances between each of the electrodes 701-704 are selected so as to meet the surface area requirements described above.

In the embodiments described above, both the transmitting coupler 101 and the receiving coupler 103 comprise essentially similar capacitive coupling elements. However, other coupling configurations may be envisaged in which the capacitive coupling elements and/or the inductive coupling elements at the transmitting and receiving couplers are different. For instance, an electrode configuration based on a combination of any of the electrode shapes described above may be envisaged.

Further, the contactless coupler may be employed as a contactless Ethernet coupler for power and data signal transmission. As a further example, the contactless coupler may be suited, for example, for operation in environments containing fluids, such as water and/or oil. In this regard, the contactless coupler is capable of providing a stable and reliable connection to a mating contactless coupler under such conditions and with increased reliability with respect to conventional connectors. The contactless coupler may, for instance, be provided within a flexible cable, or in a rigid connector case. Namely, the contactless coupler is particularly suited to be provided in connectors of small form factor such as M18 connectors. Also, the electronic circuits that are used for controlling the coupling units of the contactless coupler may be provided in a separate case remote from the mechanical parts of the connector, whereas flexible cable is used for connecting the circuit elements to the coupling units.

What is claimed is:

1. A contactless coupler, comprising:
    an inductive coupling element adapted to transmit and/or receive power by inductive magnetic coupling; and
    a capacitive coupling element adapted to transmit and/or receive a data signal by capacitive coupling, wherein the capacitive coupling element comprises a plurality of capacitive electrodes disposed at an end of the coupler in concentric loop shapes, a length of the loop increases from the innermost capacitive electrode to the outermost capacitive electrode and a width of the loop decreases from the innermost capacitive electrode to the outermost capacitive electrode, such that surface areas of the loops are substantially the same.

2. The contactless coupler of claim 1, wherein each of the plurality of capacitive electrodes is adapted to establish a capacitive coupling with a predetermined capacitance value when facing a corresponding capacitive electrode of another contactless coupler and separated from the corresponding capacitive electrode by a desired coupling distance.

3. The contactless coupler of claim 2, wherein the predetermined capacitance is greater than or equal to a capacitance value that ensures a transfer of the data signal at the desired coupling distance.

4. The contactless coupler of claim 2, wherein at least one of the plurality of capacitive electrodes is formed by a plurality of electrode parts having substantially a same shape and electrically connected to each other by the loop, the electrode parts symmetrically disposed along a perimeter of the loop.

5. The contactless coupler of claim 2, wherein the loop shape and surface area of the capacitive electrodes is adapted to provide the predetermined capacitance irrespective of a rotation of the contactless coupler about a longitudinal axis.

6. The contactless coupler of claim 5, wherein at least one of the capacitive electrode loops has an opening adapted to interrupt a current path along the loop shape.

7. The contactless coupler of claim 6, wherein the opening in the loop is less than or equal to 10% of the loop length.

8. The contactless coupler of claim 5, wherein at least one of the capacitive electrode loops has a plurality of openings adapted to interrupt a current path along the loop shape.

9. The contactless coupler of claim 1, wherein the capacitive coupling electrodes are disposed on a support element provided at the end of the coupler, the support element comprised of non-magnetic and non-conducting material.

10. The contactless coupler of claim 9, wherein the inductive coupling element is disposed inside the support element.

11. The contactless coupler of claim 1, wherein at least one capacitive electrode can only receive data and at least one capacitive electrode can only transmit data.

12. The contactless coupler of claim 1, further comprising a capacitive coupling controller adapted to apply and/or receive a voltage to and/or from at least one of the capacitive electrodes, said voltage being indicative of a data signal to be transmitted and/or received by the at least one of the capacitive electrode.

13. A contactless coupling system, comprising:
a transmitting side and a receiving side, each side comprising a contactless coupler;
the contactless coupler comprising an inductive coupling element adapted to transmit and/or receive power by inductive magnetic coupling and a capacitive coupling element adapted to transmit and/or receive a data signal by capacitive coupling, wherein the capacitive coupling element comprises a plurality of capacitive electrodes disposed at the coupler front-end in concentric loop shapes, a length of the loop increases from the innermost capacitive electrode to the outermost capacitive electrode and a width of the loop decreases from the innermost capacitive electrode to the outermost capacitive electrode, such that surface areas of the loops are substantially the same, and the front-end of the contactless coupler on the transmitting side faces the front-end of the contactless coupler on the receiving side.

14. The contactless coupling system of claim 13, wherein each of the plurality of capacitive electrodes on the transmitting or receiving side is adapted to establish a capacitive coupling with a predetermined capacitance value when facing a corresponding capacitive electrode on the receiving or transmitting side and separated from the corresponding capacitive electrode by a desired coupling distance.

15. The contactless coupler of claim 14, wherein the loop shape and surface area of the capacitive electrodes is adapted to provide the predetermined capacitance irrespective of a rotation of the contactless coupler about a longitudinal axis.

16. The contactless coupler of claim 15, wherein at least one of the capacitive electrode loops on each of the transmitting and receiving sides has an opening adapted to interrupt a current path along the loop shape.

* * * * *